United States Patent
Sharma

(12) 
(10) Patent No.: US 10,735,940 B1
(45) Date of Patent: Aug. 4, 2020

(54) STEERING OF ROAMING BASED ON DEVICE TYPE IN WIRELESS NETWORKS

(71) Applicant: T-Mobile USA, Inc., Bellevue, WA (US)

(72) Inventor: Nandita Sharma, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/543,275

(22) Filed: Aug. 16, 2019

(51) Int. Cl.
*H04W 8/04* (2009.01)

(52) U.S. Cl.
CPC .................... *H04W 8/04* (2013.01)

(58) Field of Classification Search
CPC .......... H04W 8/26; H04W 8/04; H04W 8/10; H04W 8/02; H04W 8/08
See application file for complete search history.

(56) References Cited

U.S. PATENT DOCUMENTS

| 2014/0199962 A1* | 7/2014 | Mohammed | H04M 15/70 455/406 |
| 2015/0163366 A1* | 6/2015 | Mohammed | H04M 15/70 455/408 |

* cited by examiner

*Primary Examiner* — Diane D Mizrahi
(74) *Attorney, Agent, or Firm* — Loeb & Loeb LLP

(57) ABSTRACT

Steering logic from a home network may allow a subscriber to roam toward a preferred foreign network while the subscriber is roaming from the home network to the foreign network. The steering logic may be built around the capability of the device or its information in various registers or other information that indicates which networks are preferred for the device. This logic may be part of a roaming agreement that is negotiated between mobile network operators (MNOs); e.g., home MNOs and foreign MNOs. In this manner, internet-of-things (IoT) devices may be steered to a specific network or first foreign network provider, voice-over-long-term-evolution (VoLTE) devices may be steered to a second foreign network partner, and non-VoLTE devices may be steered to a third foreign network partner. In this way, a network operator may preserve their network bandwidth for devices that require or may use particular network technologies while others do not.

20 Claims, 4 Drawing Sheets

STEERING OF ROAMING BASED ON DEVICE TYPE IN WIRELESS NETWORKS

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Steering of roaming describes a process for managing connectivity to a mobile network for electronic devices that are not subscribers of the network. This process allows mobile network operators to decide which other network ("foreign network") their subscribers will use when roaming from their subscribed network ("home network") to a foreign network is maintained by another mobile operator. Steering allows operators to manage their network to optimize bandwidth for their subscribers and enter agreements with other operators that are advantageous to all parties. Steering is typically accomplished via two methods: network based and subscriber identification module (SIM) based. These approaches may be used separately or together. In a network-based approach, a foreign network asks permission from a home network for the home network subscriber to join the foreign network while roaming. A steering system maintained by the home network operator will then decide to reject or accept the request to join the network. Network-based steering is dynamic and foreign network targets may change rapidly. Accuracy for selecting a desired network becomes difficult when there are three or more operator partners in the same area. In SIM-based steering, a preferred network list is contained within the SIM of the subscriber's mobile device. The list is typically maintained by an over-the-air (OTA) messaging system. This maintenance may suffer from significant logistic issues. Further, differences between handsets may make it difficult for a single system to service all available handset types. These challenges are only amplified when considering the explosion of internet-of-things (IoT) devices within the marketplace.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

In an embodiment, a mobile electronic device may operate in geographic areas covered by more than one network operating in different frequency bands. A home network may be maintained by the subscriber's operator or "home network operator" while a foreign network may be maintained by a different operator or "foreign network operator." When the subscriber is roaming from the home network to the foreign network, steering logic from the home network may allow roaming toward a preferred foreign network. The steering logic may be built around the capability of the device or its information in the "Equipment Identity Register" (EIR). The EIR may include a database that contains a record of the all the electronic devices and mobile stations (MS) that are allowed in a network as well as a database of all equipment that is banned, e.g. because it is lost or stolen. The MS may include mobile telephone equipment and a corresponding Subscriber Identity Module (SIM). In this manner, IoT devices may be steered to a specific network or first foreign network provider, voice-over-long-term-evolution (VoLTE) devices may be steered to a second foreign network partner, and non-VoLTE devices may be steered to a third foreign network partner. In this way, a network operator may optimize their roaming agreements based on the device type and capability of the devices.

A system may steer an electronic device to a foreign network during roaming based on capabilities of the electronic device and a roaming agreement between the home MNO and the foreign MNO. The home network base station may include a home network processor and a home network memory storing instructions for execution by the home network processor, the instructions may include a home coverage area. The system may also include a mobile management entity (MME) communicatively connected to the home network base station and include further instructions for execution by the home network processor. The instructions may store roaming agreement rules for the electronic device. The roaming agreement rules may indicate a network capability for the electronic device to join either a first foreign network base station or a second foreign network base station. The electronic device is capable of joining both the first and second foreign network base stations. The instructions may also receive a first request from the first foreign network base station and a second request from the second foreign network base station for the electronic device. The electronic device is outside the home coverage area but within a first foreign coverage area and a second foreign coverage area. The instructions may then send data to the first foreign network base station in response to the first request and to the second foreign network base station in response to the second request. The data may indicate a network capability of the electronic device. One of the first foreign network base station or the second foreign network base station may issue credentials to the electronic device for joining the first foreign network base station or the second foreign network base station, respectively, based on the network capability of the electronic device and the roaming agreement rules.

A computer-implemented method may also steer an electronic device to a foreign network during roaming based on capabilities of the electronic device and a roaming agreement between the home MNO and the foreign MNO. The method may store, using a processor of a home network base station, roaming agreement rules for the electronic device. The roaming agreement rules may indicate a network capability for the electronic device to join either a first foreign network base station or a second foreign network base station. The electronic device is capable of joining both the first and second foreign network base stations. The method may then receive a first request from the first foreign network base station and a second request from the second foreign network base station for the electronic device. The electronic device is outside the home coverage area but within a first foreign coverage area and a second foreign coverage area. Also, the method may send data to the first foreign network base station in response to the first request and to the second foreign network base station in response to the second request. The data may indicate a network capability of the electronic device. One of the first foreign network base station or the second foreign network base station may issue credentials to the electronic device for joining the first foreign network base station or the second foreign network base station, respectively, based on the network capability of the electronic device and the roaming agreement rules.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
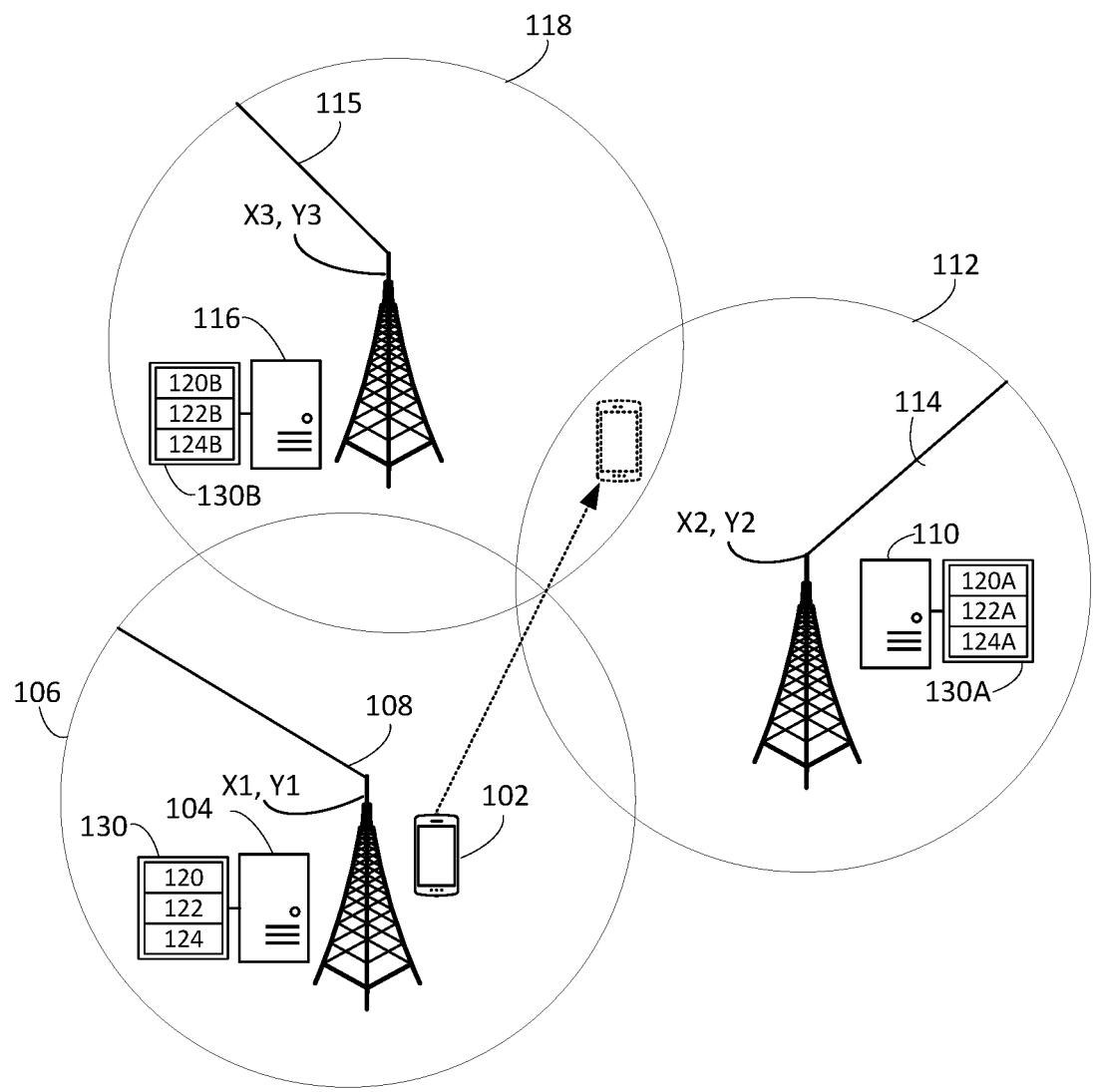
FIG. 1 illustrates an exemplary system for steering an electronic device to a foreign network during roaming in accordance with the current disclosure.

Mobile electronic devices operate in geographic areas covered by more than one network operating in different frequency bands. Each electronic device may be owned by a subscriber who pays a fee for access to one or more networks. A home network may be maintained by the subscriber's operator or "home network operator" while a foreign network may be maintained by a different operator or "foreign network operator."

Subscribers may "roam" from a home network to a foreign network as the subscriber's electronic device moves out of range of the home network and into the range of a foreign network. When the subscriber is roaming from the home network to the foreign network, steering logic may allow roaming toward a preferred foreign network. The steering logic may be built around the capability of the electronic device as indicated in one or more registers or databases maintained by the home network operator. In some embodiments, electronic device capability data may be maintained by the home network operator in an "Equipment Identity Register" (EIR). The EIR may include a database that contains a record of the all the electronic devices 102 and mobile stations (MS) that are allowed in the home network as well as a database of all equipment that is banned, e.g. because it is lost or stolen, and device capability data. For example, via the MS, the EIR may include mobile telephone equipment and a corresponding Subscriber Identity Module (SIM). In this manner, particular electronic devices such as mobile phones or IoT devices may be steered to a specific foreign network operator, voice-over-long-term-evolution (VoLTE) devices may be steered to a second foreign network operator, and non-VoLTE devices may be steered to a third foreign network operator. In this way, a network operator may optimize the subscriber experience while reserving bandwidth at each foreign network for electronic devices with capabilities that match the foreign network.

In sum, the present application describes a technical solution to the technical problem of preserving bandwidth of foreign networks during electronic device roaming from a home network to a foreign network. The present application solves this technical problem by modifying the operation of mobile telecommunications systems generally and the attach procedure in particular to steer subscriber electronic devices to access only those foreign networks meeting particular capabilities of the device in accordance with rules set forth by roaming agreements between the MNOs.

The present application describes embodiments including various elements that are present in a mobile telecommunications network such as modules, blocks, functions, data structures, etc. These elements are not an exhaustive collection of all elements needed to perform the functions of a mobile telecommunications network (i.e., an attach procedure during electronic device roaming) or the disclosed embodiments. Indeed, the elements associated with the systems and methods described in this application are only some of the possible elements that are needed to implement the embodiments. Some embodiments may include more or fewer elements than those that are described with the embodiments, as known by a person having ordinary skill in the art of mobile telecommunications systems.

FIG. 1 illustrates a system 100 supporting operation of an electronic device 102 operating in a dual band mobile communication system with coverage areas as described herein. The electronic device 102 may be any electronic device that is capable of sending and/or receiving a radio signal for communicating digital information from the electronic device and to another electronic device via the system 100. In some embodiments, the electronic device 102 includes a cellular telephone, a smartphone, a smart watch, an Internet of Things device, a computing device, etc.

A "home network" base station 104 may be maintained by a mobile network operator (MNO) corresponding to the electronic device 102. The home network base station 104 may include a memory storing processor-executable instructions and data and a processor to facilitate the MNO maintaining the network. For example, the home network memory may include data to define a home coverage area 106 having a center point X1, Y1 and having a first radius 108. A first foreign network base station 110 may also include a memory storing processor-executable instructions and data as well as a processor for executing the instructions. The data and/or instructions for the first foreign network base station 110 may define a first foreign coverage area 112 having a center point X2, Y2 and radius 114. The first foreign network base station 110 may also have one or more radios supporting communication with the electronic device 102. A second foreign network base station 116 may also include a memory storing processor-executable instructions and data as well as a processor for executing the instructions. The data and/or instructions for the second foreign network base station 116 may indicate a second foreign coverage area 118 generally defined by a center point X3, Y3 and radius 115. The second foreign network base station 116 may also have one or more radios supporting communication with the electronic device 102. The base stations 104, 110, 116 may include one or more radios operating at different frequency bands supporting communication with the electronic device 102 as well as one or more processors and memories storing processor-executable instructions for implementing the various modules, blocks, functions, data structures, etc., as herein described.

Even though coverage areas of any radio system may vary due to terrain and other conditions, in various embodiments, the radio(s) of the home network base station 104 may operate with different characteristics than the first foreign network base station 110 and/or the second foreign network base station 116. For example, the home network base station 104 may operate at a lower power and/or may have a limited coverage area compared to the foreign network base stations 110, 116 or may support different types of mobile technologies (e.g., GSM, IS-95, UMTS, CDMA2000, LTE, 5G, VoLTE vs. 2G or 3G non-VoLTE standards, narrowband vs. broadband, etc.) that correspond to capabilities of the electronic device 102.

The electronic device 102 may be subscribed to a mobile network operator (MNO) that maintains the home network base station 104. A subscriber may be an entity who is party to a contract with the MNO for access to public telecommunications services. In addition to different network standards and capabilities, each of the home network base station 104, the first foreign network base station 110, and the second foreign network base station 116 may be maintained by different MNOs. While FIG. 1 only shows three base stations 104, 110, and 116 each having a different MNO, the embodiments described herein apply equally to systems having different numbers of base stations and corresponding MNOs.

The electronic device is able to maintain connectivity beyond the coverage area 106 of the home network base station 104 shown in FIG. 1 despite only the home network base station 104 being maintained by a home network MNO having a contract for telecommunications services with a subscriber corresponding to the electronic device 102. For example, the electronic device 102 may move out of range of the home coverage area 106 and into range of the first and/or second foreign coverage area 112, 118. A roaming module 120, 120A, 120B for the home network base station 130, the first foreign network base station 130A, and/or the second foreign base station 130B may include processor-executable instructions that define rules that allow the electronic device 102 to maintain optimal network connectivity while also preserving bandwidth of the various networks by ensuring that the device 102 only connects to network matching the capabilities of the device 102.

Each MNO maintains a Mobile Management Entity (MME) 130, 130A, 130B for the respective base station 104, 110, 116, respectively, including a Home Location Register (HLR) 122, 122A, 122B for their base stations 104, 110, 116. The HLR is a database for the MNO in which information from all mobile subscribers is stored. The HLR contains information about the subscribers identity, telephone number, the associated services for the number or account, and general information about the location of the subscriber. The exact location of the subscriber is kept in a Visitor Location Register (VLR), as described below. The MME is the key control node for the system 100. Each MME includes instructions for idle mode paging and tagging procedure including retransmissions for the electronic device 102. The MMEs also include instructions for activation/deactivation processes and also instructions for choosing the gateway and base station for an electronic device 102 at the initial attach and at the time of intra-LTE handover involving Core Network (CN) node relocation. The MME also includes instructions for authenticating the user by interacting with the respective base stations 104, 110, and 116.

The subscriber information is created by the MNO in the HLR at the time of purchase of subscription contract by a subscriber. Each MNO also maintains a visitor location register (VLR) 124, 124A, 124B. The VLR is a database that contains temporary information about a roaming or otherwise temporary subscriber that does not have a contract for services with the MNO. It is used to service the visiting or roaming subscribers. When the electronic device 102 moves from one coverage area to another (e.g., 106 to 112 and/or 118), a processor of the electronic device 102 may execute processor-executable instructions stored in a memory of the device to perform an attach procedure with the base station 110, 116. The electronic device 102 and the home network MME 130 may each include a processor in communication with a memory storing instructions to implement an attach procedure for steering of roaming for the electronic device 102. In some embodiments, the memory of the electronic device 102 may include processor-executable instructions to initiate an attach procedure by sending an attach request to base stations that are within communication range (e.g., base stations 110, 116). The first foreign base station 110 and the second foreign base station 116 may include processor-executable instructions to analyze the attach request and derive information about the electronic device 102 from parameters included in the attach request that is received from the electronic device 102. For example, the first foreign network MME 130A and the second foreign network MME 130B may include processor-executable instructions to derive a device type, an address for computing devices associated with the home network MNO (e.g., the home network MME 130, base station 104, etc.), and also to send an identification request to the home network MME 130 from the attach request. The first foreign network MME 130A and the second foreign network MME 130B may also include processor-executable instructions to send other requests to the components of the system 100 (e.g., the electronic device 102, the home network base station, etc.) if the electronic device 102 is unknown to one or more of the MMEs 130, 130A, 130B (i.e., the HLR or VLR of the first or second foreign network MME does not include an international mobile subscriber identity (IMSI) and/or international mobile equipment identity (IMEI) for the electronic device 102). In some embodiments, requests between the components of the system to complete an attach procedure may include an attach request, an identification request, an identity request, an update location request, and a modify bearer request. The electronic device 102 may also include processor-executable instructions to send an identity response (e.g., an international mobile subscriber identity (IMSI) and/or international mobile equipment identity (IMEI)) to the MMEs 130A, 130B. In some embodiments, the electronic device 102 may include processor-executable instructions to send the identity response to the foreign MMEs 130A, 130B in response to the identity request from the MME to the electronic device 102.

Each of the foreign network MMEs 130A, 130B may also include processor-executable instructions to send an update location request (ULR) to the home network MME 130. The home network MME 130 may include processor-executable instructions to send data to allow the foreign network MMEs to identify capabilities of the electronic device 102 that is attempting to attach to the respective networks. In some embodiments, the home network MME 130 may share subscriber data with the foreign network MMEs 130A, 130B including IMSI and other data that may identify and/or allow the foreign network MMEs 130A, 130B to identify a home network operator and capabilities of the electronic device 102 upon execution of further processor-executable instructions.

The foreign network MMEs 130A, 130B may also include processor-executable instructions to determine the capabilities of the electronic device 102 using the received identity response. Each network base station 104, 110, 116 may include processor-executable instructions for identifying capabilities for a roaming electronic device 102 and a subscriber for the electronic device. In some embodiments, the MMEs 130A and 130B may include processor-executable instructions to identify a subscriber network for the electronic device 102 based on the IMSI and to identify capabilities of the electronic device 102 based on the IMEI. For example, the IMSI may indicate the first foreign network MNO as the subscriber network. In some embodiments, the foreign MMEs 130A and 130B may include further processor-executable instructions to access a corresponding roaming module 120A and 120B to identify rules for electronic devices 102 having the same MNO to join the foreign network. Additionally, the IMEI may indicate capabilities of the electronic device 102 that, in comparison to rules defined by the roaming modules (i.e., 120A, 120B), may allow the MMEs to determine whether the electronic device is able to attach to the first foreign network or the second foreign network or restrictions for the electronic device 102 to join the network. In further embodiments, the MMEs 130, 130A, 130B may include processor-executable instructions to check the received IMEI and/or IMSI against the equipment identity register (EIR) to determine whether the electronic device 102 is able to attach to the first foreign network or the second foreign network and, if so, issue credentials to the electronic device 102 to join the network. Credentials may include various methods to attach to different types of networks. For example, in some embodiments, the credentials include an authentication procedure, an update location procedure (e.g., update general packet radio service (GPRS) location procedure, etc.), location, subscriber data, etc.

For example, the processor-executable instructions may identify the electronic device 102 that is roaming away from its home network as a 2G or 3G device, as an IoT device, or as a VoLTE device. Processor-executable instructions may use rules of the roaming modules 120, 120A, 120B to steer the electronic device 102 to the foreign base station 110, 116 that includes network capabilities that match a roaming agreement between the home network MNO and one or more of the foreign network MNOs. Also, if the electronic device 102 is an IoT device and the first foreign network roaming module 120A indicates an agreement between the home network MNO and the first foreign network MNO to allow IoT devices to join the first foreign network base station 110, while the second foreign network roaming module 120B does not indicate such an agreement, then the system 100 may include further processor-executable instructions to steer the device 102 to the first foreign network by executing instructions for issuing credentials to the IoT device. Likewise, if the electronic device 102 is only 3G capable and the first foreign network roaming module 120A indicates an agreement between the home network MNO and the first foreign network MNO to not allow a 3G-only device to join a VoLTE-capable first foreign network base station 110, then the system 100 may include further processor-executable instructions to steer the device 102 to another first foreign network. In this manner, the first foreign network base station 110 and the second foreign network base station 116 may include instructions to preserve bandwidth for their networks and manage roaming more effectively.

Figure 2:
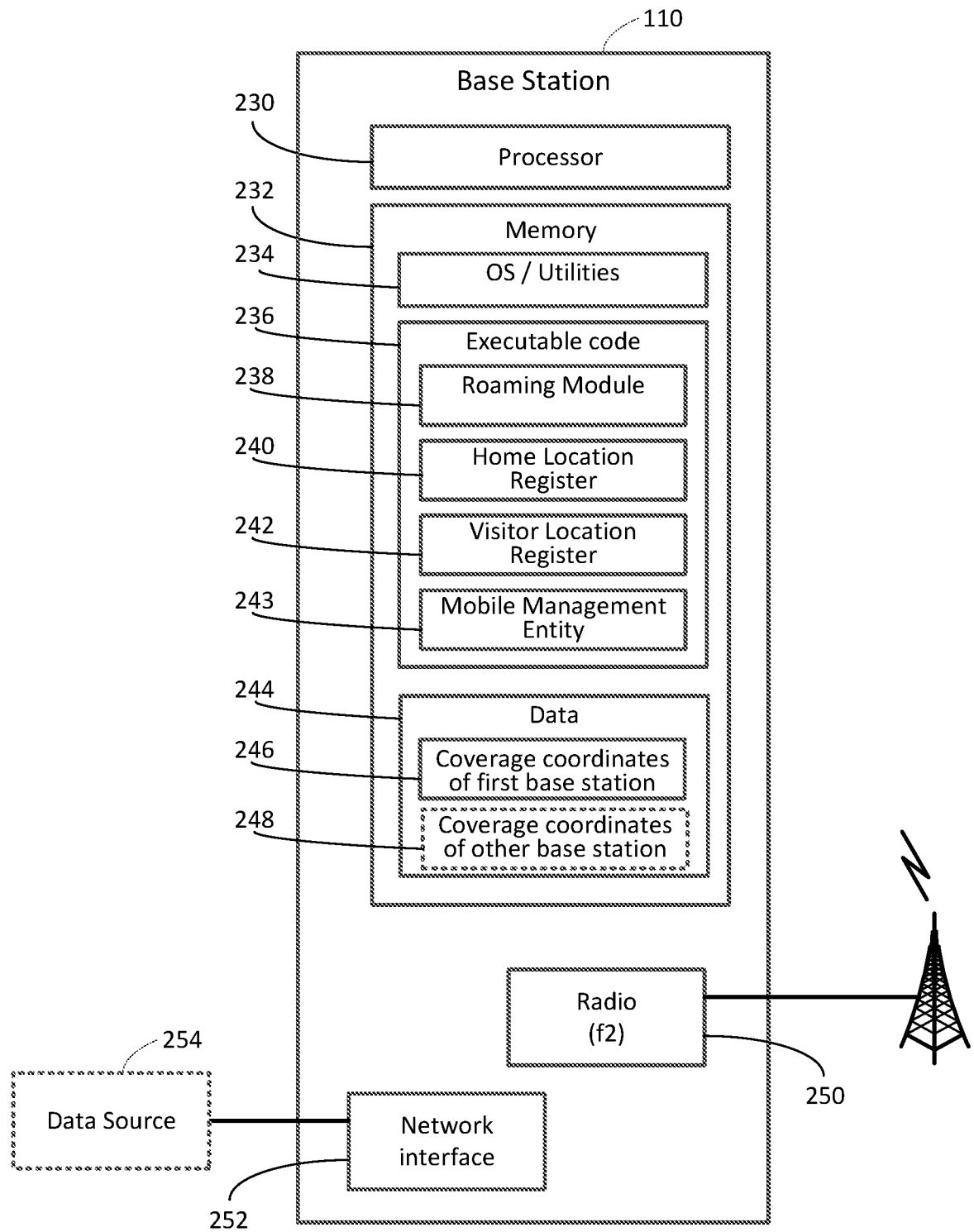
FIG. 2 is an illustration of an exemplary base station in accordance with the current disclosure.

FIG. 2 illustrates an exemplary block diagram of a base station 110 in accordance with the current disclosure. The base station 110 may include a processor 230 that is in communication with a memory 232. The memory 232 may include an operating system and utilities 234 used to manage operations of the base station including booting, memory management, communications, error handling, software updates, etc. The memory 232 may also store processor-executable instructions 236 and data 244.

The base station 110 may have a radio 250 operating at a frequency band that provides for a coverage area 112 (FIG. 1) larger than that of another frequency band in use by the home network base station 104. For example, the base station 110 may operate in a frequency band in the 700 MHz frequency range with a coverage radius 114 of as much as 7 kilometers. In many prior art systems, wide area coverage was provided by an overlapping network of similar band radios, operating at up to 2.5 GHz, but having similar coverage areas. 4G LTE is such an example. In such systems, the electronic device 102 may tell one base station when it is getting a stronger signal from another base station so that a handoff between base stations can be executed.

However, in the new 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. Unlike previous systems, the 5G implementation mixes these bands with significantly different coverage areas. This mismatch in coverage areas may cause an electronic device 102 operating these disparate bands to have a reduction in battery life simply because the electronic device 102 may need to constantly activate its NR radio in search of a signal even though it may be nowhere near an NR coverage area 106, 112, 118. By actively managing which networks specific electronic devices may join while roaming, the device-type steering embodiments described herein may use battery life as well as network capabilities of the device to reduce NR radio use and, thereby, extend battery life. For example, in some embodiments, a 5G-capable electronic device may be steered to a 3G or 4G foreign network when battery life or charge of the electronic device is below a threshold. In further embodiments, steering toward a network with lower capabilities than the device may occur when more than one network is available during roaming.

The base station 110 may also include a network interface 252 used for routing traffic from land-based switch gear (not depicted). The network interface 252 may also communicate with an external data source 254.

The executable instructions 236 may include various modules or routines that are used for device-type based steering as described herein. For example, in an embodiment, the memory 232 may include a roaming module 238, a home location register 240, a visitor location register 242, a mobile management entity 243. The data 244 may include coverage coordinates or descriptors, capabilities (e.g., 2G, 3G, 4G, or 5G, narrow band, etc.) of the coverage areas of the base stations. The data 244 may also include coverage coordinates for other base stations (not depicted) having small coverage areas compared to that of the foreign network base stations 110, 116.

Figure 3:
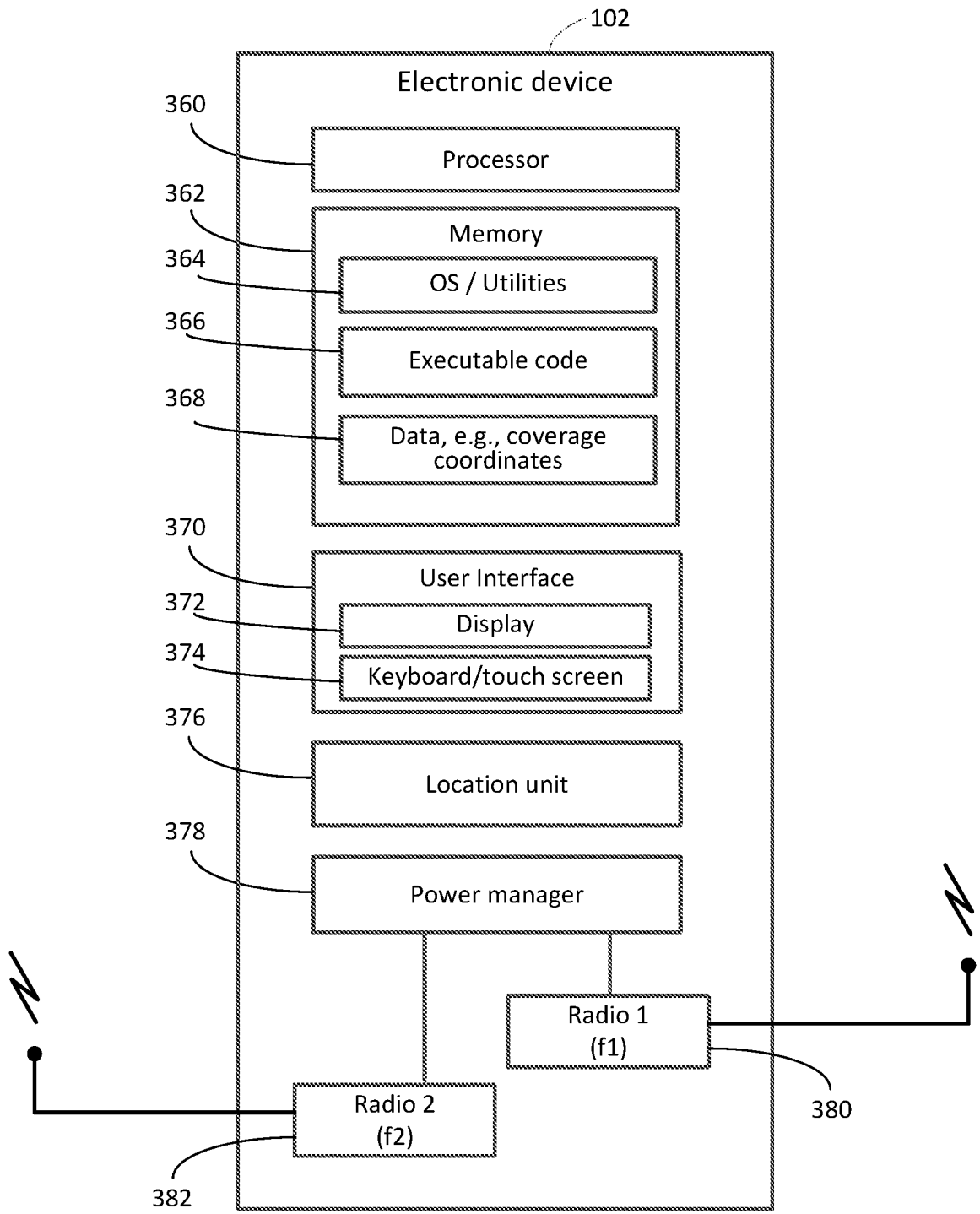
FIG. 3 is an illustration of an electronic device in accordance with the current disclosure.

An embodiment of an electronic device 102 may be illustrated in FIG. 3. The electronic device 102 may be a cellular telephone, a tablet, a laptop, IoT device, etc. In other cases, the electronic device 102 may be any of a number of items that increasingly rely on network connectivity, such as a vehicle or other device. The electronic device 102 may include a processor 360 and memory 362 including an operating system and utilities 364, executable code 366 that may include both native and downloaded applications, and data memory 368. The data memory 368 may include coverage information for small coverage area frequency bands and specific device capabilities, such as coordinates or a descriptor as described above.

The electronic device 102 may also include a user interface 370 that itself may incorporate a display 372 and input device 374 such as a keyboard or touchscreen. The user interface 370 may be in communication with another module that includes processor-executable instructions to provide information to a user regarding the availability and/or activity on available frequency bands. For example, in a 3G network, a visual or auditory indicator may signal when the electronic device 102 is operating on a 3G millimeter wave cell. In another example, when a user is near a 5G NR cell that is available via the roaming plan, a map may be displayed via the display 372 showing the user the location of the NR cell along with the user's location. That way, the user may decide whether to travel to the NR cell should it provide a desirable performance or cost benefit. Similarly, the module may include instructions to persuade a user to move from one network to another when device capabilities and roaming agreements permit. For example, processor-executable instructions may present a benefit (i.e., billing reduction, minutes boost, data availability boost, etc.) to switch between available networks that meet the subscriber's device capabilities based on bandwidth availability (e.g., from a low-bandwidth-available 5G network to a high-bandwidth-available 3G network when conditions permit).

A location unit 376 may include a GPS receiver but may also rely on cell tower triangulation, Wi-Fi positioning (WPS), or other location techniques. Unlike the currently disclosed system, Wi-Fi positioning may require a mobile device to constantly monitor for Wi-Fi SSID and MAC addresses and use those with an external database to infer the location of the device from the location the Wi-Fi access point.

The electronic device 102 may have at least two radio units. A first radio 380 may operate at a frequency band corresponding to the home network base station 104. In the 5G example, this may be a millimeter wave radio operating in a range around 50 GHz. A second radio 382 may operate at a lower frequency, for example, in a more conventional 4G frequency band such as around 700 MHz up to around 2700 MHz. Of course, other radios may also be present, including Bluetooth, Wi-Fi, NFC, or more.

The illustrated examples above are simplified for convenience and ease of understanding. It should be understood that more complex arrangements of wide area and small area coverages are likely, including multiple high frequency cells with relatively small coverage areas in one coverage area or small area coverages overlapping large coverage area boundaries.

Figure 4:
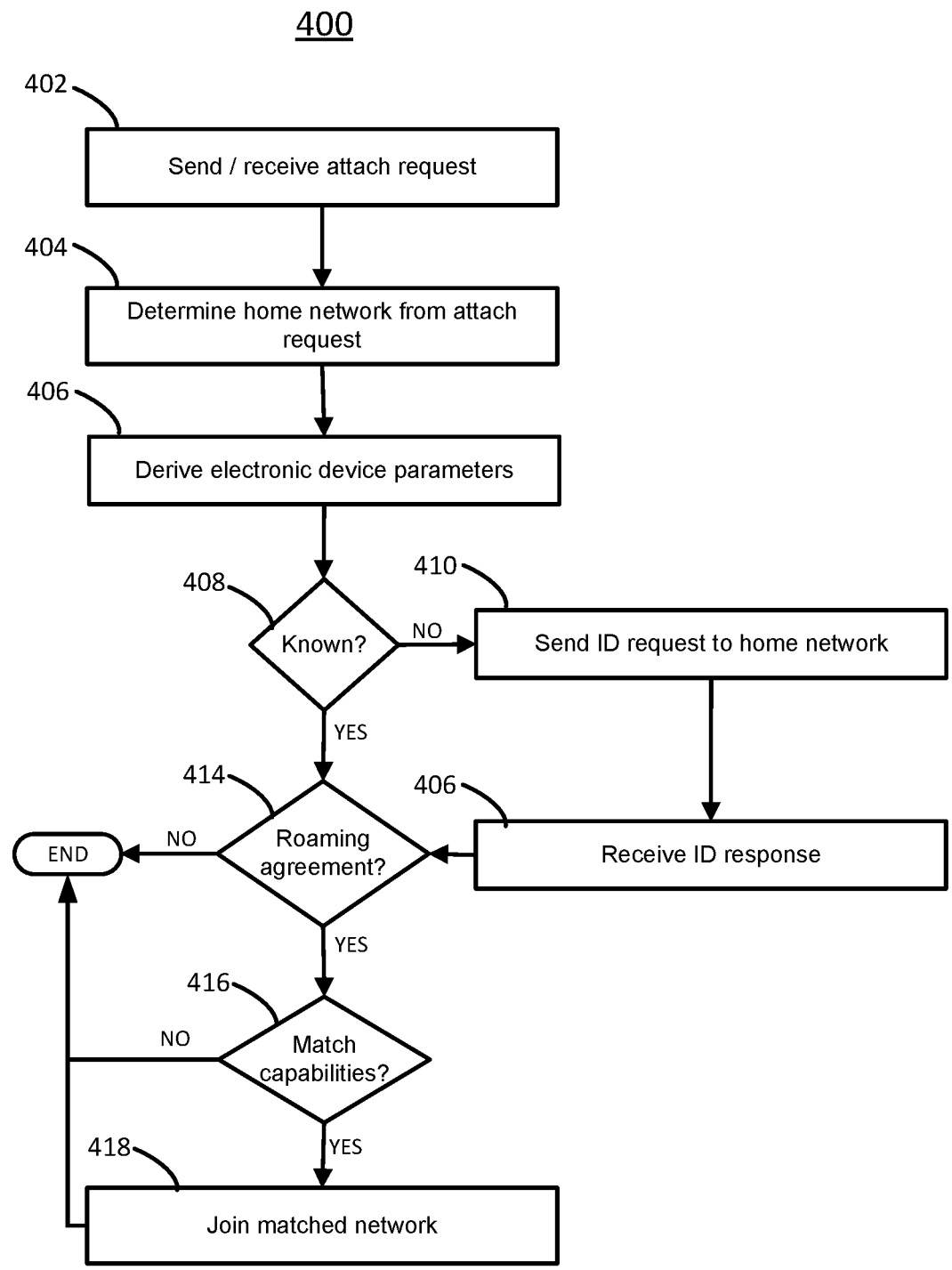
FIG. 4 is an illustration of a flow chart for a method for steering an electronic device to a foreign network during roaming in accordance with the current disclosure.

FIG. 4 is a flowchart of a method 400 of operating a system 100 to steer electronic devices 102 during roaming to foreign networks based on device type and capability to preserve bandwidth on high-traffic networks. Each step of the method 400 is one or more computer-executable instructions (e.g., modules, blocks, stand-alone instructions, etc.) performed on a processor of a server or other computing device (e.g., base station, electronic device, other computer system illustrated in FIG. 1 and/or described herein) which may be physically configured to execute the different aspects of the method. Each step may include execution of any of the instructions as described in relation to the system 100 as part of the device-type-based-steering systems and methods described herein or other component that is internal or external to the system 100. While the below blocks are presented as an ordered set, the various steps described may be executed in any particular order to complete the methods described herein.

At block 402, the method 400 may send or receive an attach request from the electronic device to a base station (e.g., 110, 116). The attach request may include parameters to allow the method 400 to identify the type of device that sent the attach request.

At block 404, the method 400 may determine a home network MME 130 or other home network information for the electronic device 102 based on the received attach request. Home network information may include an MNO name or other identification of the home network MNO corresponding to the electronic device.

At block 406, the method 400 may determine parameters for the electronic device 102 based on the received attached request. For example, the first foreign network MME 130A and the second foreign network MME 130B may derive a device type, an address for the home network MME 130, and also to send an identification request to the home network MME 130 from the attach request.

At block 408, the method 400 may determine if the electronic device 102 is known or unknown to the first foreign network MME 130A and/or the second foreign network MME 1306 (i.e., the HLR or VLR of the first or second foreign network MME does not include an international mobile subscriber identity (IMSI) and/or international mobile equipment identity (IMEI) or other identification for the electronic device 102). If the device 102 is unknown, then the method may proceed to block 410.

At block 410, the method 400 may send an identity request to a home network of the electronic device 102 and, at block 412, receive an identity response to the identity request (e.g., an international mobile subscriber identity (IMSI) and/or international mobile equipment identity (IMEI)) to the MMEs 130A, 130B. In some embodiments, the electronic device 102 may send the identity response to the foreign MMEs 130A, 1306 in response to the identity request from the MME to the electronic device 102.

At block 408, if the electronic device 102 is known (i.e., the HLR or VLR of the first or second foreign network MME includes an international mobile subscriber identity (IMSI) and/or international mobile equipment identity (IMEI) or other identification for the electronic device 102), then the method may proceed to block 414.

At block 414, the method 400 may determine if the home network MNO has a roaming agreement with the first foreign network MNO and/or the second foreign network MNO. In some embodiments, the method 400 may use an IMSI of the electronic device 102 to identify the subscriber for the electronic device 102. If no roaming agreement exists with either the first foreign network MNO or the second foreign network MNO, then the method may proceed to block 416 and cause the electronic device 102 to indicate that connectivity to the networks is not possible or other indication of a loss of connectivity. If a roaming agreement exists, the method may proceed to block 418.

At block 418, the method 400 may determine if the capabilities of the electronic device 102 match one or more of the first foreign network base station 110 and/or the second foreign network base station 116. For example, the method may identify the electronic device 102 that is roaming away from its home network as a 2G or 3G device, as an IoT device, as a VoLTE device, or other type of network access and device capabilities. Block 418 may use rules of the roaming modules 120, 120A, 120B to steer the electronic device 102 to the foreign base station 110, 116 that includes network capabilities that match a roaming agreement between the home network MNO and one or more of the foreign network MNOs.

Also, if the electronic device 102 is an IoT device and the first foreign network roaming module 120A indicates an agreement between the home network MNO and the first foreign network MNO to allow IoT devices to join the first foreign network base station 110, while the second foreign network roaming module 120B does not indicate such an agreement, then, at block 420, the method may steer the device 102 to join the first foreign network. Likewise, if the electronic device 102 is only 3G capable and the first foreign network roaming module 120A indicates an agreement between the home network MNO and the first foreign network MNO to not allow a 3G-only device to join a VoLTE-capable first foreign network base station 110, then, at block 420, the method 400 may steer the device 102 to join the second foreign network or another foreign network. In this manner, the method 400 may preserve bandwidth for networks and manage roaming more effectively.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for steering an electronic device to a foreign network during roaming based on capabilities of the electronic device, the system comprising:

a home network base station corresponding to a home mobile network operator (MNO), the home network base station including a home network processor and a home network memory storing instructions for execution by the home network processor, the instructions including a home coverage area; and a mobile management entity (MME) communicatively connected to the home network base station and including further instructions for execution by the home network processor for:

storing roaming agreement rules for the electronic device, the roaming agreement rules indicating a network capability for the electronic device to join either a first foreign network base station or a second foreign network base station, wherein the electronic device is capable of joining both the first and second foreign network base stations;

receiving a first request from the first foreign network base station and a second request from the second foreign network base station for the electronic device, wherein the electronic device is outside the home coverage area but within a first foreign coverage area and a second foreign coverage area; and sending data to the first foreign network base station in response to the first request and to the second foreign network base station in response to the second request, the data indicating a network capability of the electronic device;

wherein one of the first foreign network base station or the second foreign network base station issues credentials to the electronic device for joining the first foreign network base station or the second foreign network base station, respectively, based on the network capability of the electronic device and the roaming agreement rules.

2. The system of claim 1, wherein the first foreign network base station corresponds to a first foreign MNO and the second foreign network base station corresponds to a second foreign MNO.

3. The system of claim 2, wherein the roaming agreement rules indicate network capabilities for the electronic device corresponding to the home MNO to join the first foreign network base station corresponding to a first foreign MNO and the second foreign network base station corresponding to a second foreign MNO.

4. The system of claim 1, wherein the first request and the second request include one or more of an attach request, an identification request, an identity request, an update location request, and a modify bearer request.

5. The system of claim 1, further comprising a roaming module that is communicatively connected to the home network base station and includes the roaming agreement rules.

6. The system of claim 1, wherein the network capability of the electronic device, the home network base station, the first foreign network base station, and the second foreign network base station include one or more of Global System for Mobile Communications (GSM), Interim Standard-95 (IS-95), Universal Mobile Telecommunications System (UMTS), Code-division Multiple Access 2000 (CDMA200), Long-Term Evolution (LTE), and fifth generation wireless technology (5G).

7. The system of claim 1, including further instructions for execution by the home network processor for storing a home location register (HLR) including data corresponding to a plurality of subscribers to the home network MNO, the data comprising at least an identity and an electronic device network capability for each subscriber.

8. The system of claim 7, wherein the first request and the second request includes an update location request.

9. The system of claim 8, wherein the data sent to the first foreign network base station in response to the first request and to the second foreign network base station in response to the second request includes an entry from the HLR corresponding to the electronic device.

10. The system of claim 1, wherein the network capability of the electronic device matches both the first foreign network base station and the second foreign network base station.

11. A computer-implemented method for steering an electronic device to a foreign network during roaming based on capabilities of the electronic device, the method comprising:
    storing, using a processor of a home network base station of a home MNO, roaming agreement rules for the electronic device, the roaming agreement rules indicating a network capability for the electronic device to join either a first foreign network base station or a second foreign network base station, wherein the electronic device is capable of joining both the first and second foreign network base stations;
    receiving, using the processor of the home network base station, a first request from the first foreign network base station and a second request from the second foreign network base station for the electronic device, wherein the electronic device is outside a home coverage area of the home network base station, but within a first foreign coverage area and a second foreign coverage area; and
    sending data to the first foreign network base station in response to the first request and to the second foreign network base station in response to the second request, the data indicating a network capability of the electronic device;
    wherein one of the first foreign network base station or the second foreign network base station issues credentials to the electronic device for joining the first foreign network base station or the second foreign network base station, respectively, based on the network capability of the electronic device and the roaming agreement rules.

12. The method of claim 11, wherein the first foreign network base station corresponds to a first foreign MNO and the second foreign network base station corresponds to a second foreign MNO.

13. The method of claim 12, wherein the roaming agreement rules indicate network capabilities for the electronic device corresponding to the home MNO to join the first foreign network base station corresponding to a first foreign MNO and the second foreign network base station corresponding to a second foreign MNO.

14. The method of claim 11, wherein the first request and the second request include one or more of an attach request, an identification request, an identity request, an update location request, and a modify bearer request.

15. The method of claim 13, wherein the roaming agreement rules include the home MNO, the first foreign MNO, and the second foreign MNO.

16. The method of claim 11, wherein the network capability of the electronic device, the home network base station, the first foreign network base station, and the second foreign network base station includes one or more of Global System for Mobile Communications (GSM), Interim Standard-95 (IS-95), Universal Mobile Telecommunications System (UMTS), Code-division Multiple Access 2000 (CDMA200), Long-Term Evolution (LTE), and fifth generation wireless technology (5G).

17. The method of claim 11, further comprising storing a home location register (HLR) including data corresponding to a plurality of subscribers to the home network MNO, the data comprising at least an identity and an electronic device network capability for each subscriber.

18. The method of claim 17, wherein the first request and the second request includes an update location request.

19. The method of claim 18, wherein the data sent to the first foreign network base station in response to the first request and to the second foreign network base station in response to the second request includes an entry from the HLR corresponding to the electronic device.

20. The method of claim 11, wherein the network capability of the electronic device matches both the first foreign network base station and the second foreign network base station.

* * * * *